Patented Mar. 2, 1954

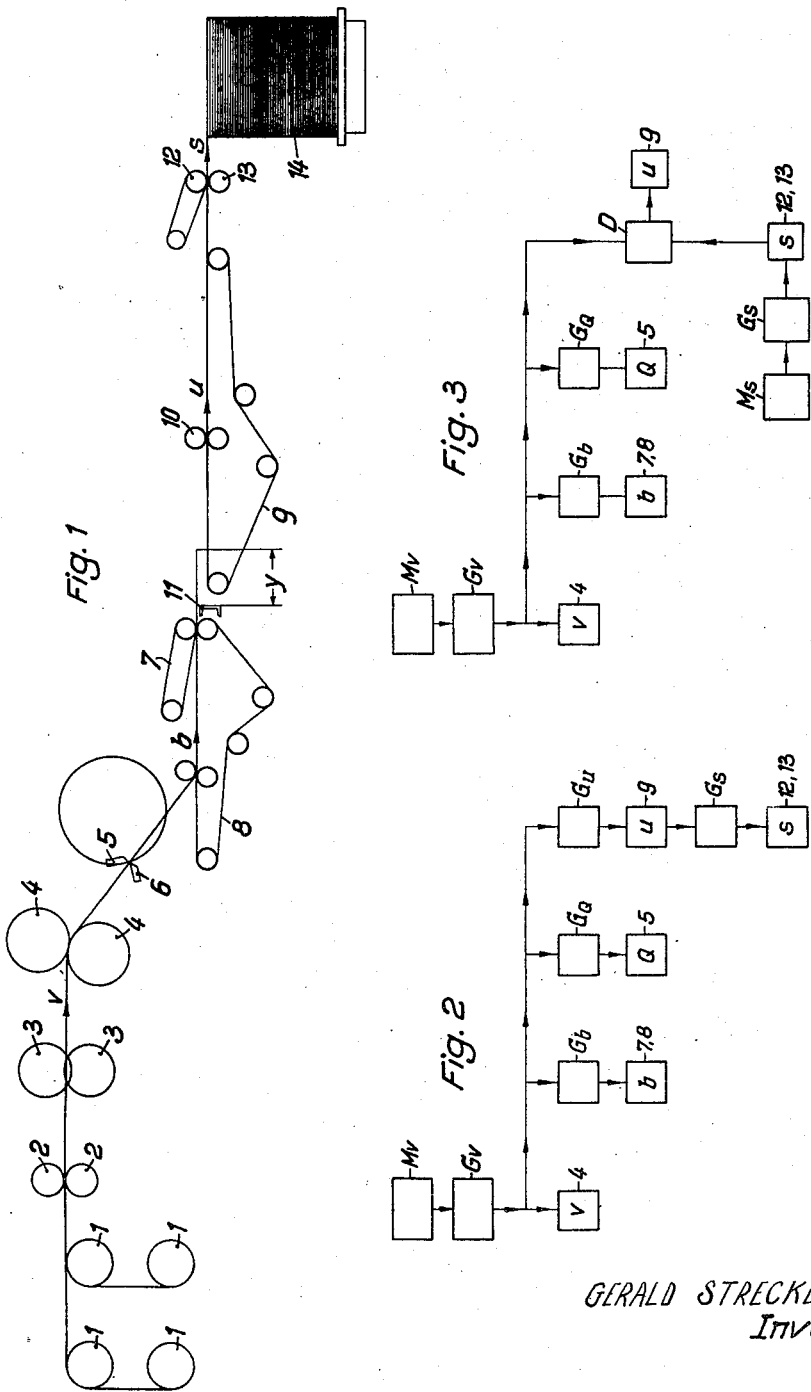

2,670,955

UNITED STATES PATENT OFFICE 2,670,955

CONVEYER DRIVING MEANS FOR SHEET CUTTING AND STACKING DEVICES

Gerald Strecker, Darmstadt-Eberstadt, Germany, assignor of one-half to Kommandit-Gesellschaft, or limited liability company, Dr. Otto C. Strecker, Darmstadt-Eberstadt, Germany, a corporation of Germany, and one-half to Maschinenfabrik zum Bruderhaus Gesellschaft mit beschränkter Haftung, Reutlingen, Germany, a corporation of Germany Application August 24, 1950, Serial No. 181,128

2 Claims. (Cl. 271—76)

This invention relates to machines for transversely cutting webs of paper or other material and thereby converting a continuous web into one or more stacks of sheets. It is particularly concerned with high duty machines in which the web is fed at high speed and the cutter makes many cuts per minute.

Its purpose is to ensure the satisfactory operation of such machines, even at very high speeds, and to facilitate the initial setting of the machines and minimize the waste of material at the beginning of their operation.

As is well known such machines comprise supply means for feeding the web to be severed from a supply roll, a transverse cutter which severs into sheets the web so fed to it, a high speed conveyor or take-off means to take the cut sheets from the cutter, a low-speed conveyor which receives the sheets in overlapped condition from the high-speed conveyor, and a sheet delivery means or ejector which takes the sheets from the low-speed conveyor and stacks them in a pile. In addition the machine comprises means for driving all these parts at suitable and related speeds. There may be additional or auxiliary elements, such as mountings for spare feed rolls, lengthwise cutters for slitting the web lengthwise, means for grooving or scoring the web, and so forth; these do not affect the substance of the invention and are hereinafter disregarded.

A principal object of this invention is a machine of this kind for cutting webs transversely having means for driving the sheet delivery mechanism or ejector wholly independently of the drive of the supply means, transverse cutter and high-speed conveyor or take-off mechanism, together with means for driving the low-speed conveyor at a speed which is dependent on both the speed of the supply means, transverse cutter or high speed conveyor and the speed of the sheet delivery means.

A further object of the invention is a driving means for the low-speed conveyor which drives that conveyor at a speed which for high speeds of the supply means, transverse cutter and high-speed conveyor is determined mainly by the speed of those parts and for low speeds of those parts is determined mainly by the speed of the independently driven sheet delivery means.

Yet another object of the invention is a machine for transversely cutting paper and like webs in which the sheet delivery means is driven independently of the web supply means, transverse cutter and high-speed conveyor and the low-speed conveyor is driven through a differential gear one member of which is driven with the supply means, transverse cutter and high-speed conveyor, and another member of which is driven with the sheet delivery means, so that the speed of the low-speed conveyor is dependent on the speeds of the supply means and of the delivery means and preferably is approximately one-eighth of their sum.

Further objects of the invention will appear from the following description.

The invention is illustrated by the accompanying drawings in which—

Figure 1 is a diagrammatic showing of the essential parts of a machine for severing webs transversely, as seen in a lengthwise section of the machine;

Figure 2 is a block diagram illustrating an existing method of driving the parts of such a machine; and Figure 3 is a block diagram illustrating the driving of the parts of such a machine in accordance with the invention.

In the machine shown in Figure 1 one or more webs of paper or other material run from supply rolls 1 through collecting rolls 2 which express air from between the webs, past a lengthwise cutter 3 if such is required to draw-in rolls 4 which draw the web from the supply rolls and feed it to the transverse cutter, which comprises a knife blade 5 upon a rotating drum co-operating with a fixed blade 6. By these cutters the web is divided into sheets of the desired width and length. From the transverse cutter the sheets are taken by a high-speed conveyor comprising endless belts and rollers 7, 8 and these feed the sheets in overlapped relation to a low-speed conveyor comprising broad stiff endless bands 9 and co-operating rollers 10. This conveyor greatly reduces the speed of the sheets and feeds them to a sheet delivery mechanism or ejector 12, 13 which stacks them in a pile or piles 14.

In such machines there are four speeds to be distinguished. There is first the speed at the draw-in rolls 4, which is the speed the web of paper or other material to be severed has from the moment of leaving the supply rolls 1 until it reaches the transverse cutter 5, 6; hereinafter this is called the supply speed. There is next the speed at the take-off rolls immediately beyond the transverse cutter, hereinafter called the take-off speed; this needs to be higher than the supply speed to keep the paper taut and to prevent the rear edge of the cut sheet being flung forward by the blade 5 of the transverse cutter. Thirdly there is the speed of the overlap belts, that is to say of the conveyor belts 9 upon which the paper is braked, and upon which the sheets are overlapped or slid one upon the other by the high-speed conveyor 7, 8; this is hereinafter called the overlap speed; naturally it must be much less than the take-off speed; its value must be particularly carefully chosen and suited to the various conditions of operation. There is fourthly the speed in the ejector or sheet delivery rolls 12, 13 of the piling mechanism, herein called the ejection speed; this must be kept within definite and quite narrow limits under all conditions of operation; if the ejection speed is too low the sheets come to a standstill before they reach their end position; if it is too high they bounce back from the abutment against which the sheets are piled; in neither case is a tidy pile obtained. Another factor to be reckoned with in addition to these speeds is the number of cuts per unit of time herein called the transverse cutting speed.

There are yet other speeds of drive to be provided for in the machine, for instance the drive of auxiliary rolls, of the lengthwise cutters, of scoring means and so forth; but they need not be considered here since they are not affected by the invention, being mostly derived directly from the supply speed.

In transverse cutters hitherto known drives at the four speeds mentioned are usually obtained from a variable speed main drive by the use of a transmission gear, commonly a variable ratio gear, for each speed. Some drives may be derived from others; for example the main drive may actuate the overlap belts or low-speed conveyor, and the latter may drive the ejector. In these machines, once the several transmission gears have been decided upon, all the speeds of drive are dependent on or proportional to the speed of the main drive to the draw-in rolls, that is to the supply speed.

The adjustment of the several variable drives, to determine the length of sheet cut and so forth is first effected at a low speed of the main drive; only when the several gears have been selected and test sheets begin to come out satisfactorily is the speed of rotation, and therefore the supply speed, increased to a working value. When this is done all the other speeds increase. So if the ejection speed was initially adjusted to a satisfactory value, even to the minimum satisfactory value, it may easily increase beyond the tolerable limit. Upon the overlap speed depends the length of free travel of the cut sheets, that is the free length of the sheet issuing from the take-off conveyor at the instant when its front edge slides over the rear edge of the preceding sheet; if this free length is too great the sheets catch one in the other and are not overlapped in orderly fashion. The risk of this is specially great at high speeds at which air resistance plays a part, forcing down the edge of the issuing sheet notwithstanding the usual lengthwise bending of the sheet to stiffen it. As the supply speed increases the overlap speed should by no means increase proportionally.

For these reasons therefore adjustment of several transmission gears is called for as the speed of the main drive is increased.

Since now the machine operator has to regulate the speed of supply according to the condition of the rolls and other factors, the take-off speed according to the requirements of the cut and the overlap speed according to the requirements of the pile stacking, his task is difficult. The consequence is that it is a common practice to adjust the take-off and overlap speeds to reasonable relative values while the machine is running slowly, and, because of the difficulty of adjusting to suit three factors, to make no attempt to readjust to fresh working conditions at high speeds. Moreover, since the operator cannot oversee from his position the requirements at all three elements of the machine there is special risk of things going wrong at high speeds, so that it is common to operate at moderate speeds.

On this account it has already been proposed to provide a special auxiliary motor for the sheet delivery rolls, which drives these rolls and the overlap belts through an overrunning or one-way clutch at a minimum allowable speed while the main motor is running slowly, and to allow the main motor on speeding up to take over the drive through a second one-way clutch. This certainly obviates difficulties during slow running of the machine; but at medium and high speeds, because the drives are dependent on the speed of the main drive, the difficulties above indicated remain and prevent full use being made of the machine.

It has also already been proposed to separate the drive of the slow-running parts beyond the take-off mechanism, that is of the overlap conveyor and ejector, from the main drive of the machine, and to drive these parts independently of the main drive from a separate variable speed motor. This makes it possible to adjust the ejection speed to a suitable value, but gives rise to difficulties in respect of overlapping. Since the ejection speed may not fall below about 20 metres per minute, there is no overlapping at all at starting. As the supply speed and take-off speed increase overlapping must begin, and it is very difficult to effect the change to overlap conditions at medium speeds. During acceleration there must at no time be too large a free length of issuing sheet, and so acceleration must be effected in steps and the operator must look out for the instant at which the last issued sheet is deposited on the overlap conveyor. But with large and heavy supply rolls upon a wide machine acceleration is very difficult and as a rule cannot be effected quickly enough. The difficulty may be lessened by reducing the overlap speed (and ejection speed); but even so some time elapses before the first overlapped sheets reach the pile; in the meantime the not overlapped sheets arriving are too slow, stick, and cause difficulties at the pile, so that overlap is often disregarded. These difficulties are still greater if sheets of two sizes are being cut at the same time.

It is to overcome these difficulties that the invention makes use of a separate variable speed drive for the sheet delivery mechanism alone, a drive which is at all speeds independent of the main drive, and derives the overlap speed both from the supply speed (or from a speed dependent on it) and also from the ejection speed, in such fashion that at low speeds of drive (low supply speed) the overlap speed depends mainly on the ejection speed while at high speeds of drive it depends mainly on the supply speed or a speed derived therefrom. More specifically the invention proposes the driving of the conveyor bands by a differential gear having members driven respectively at the ejection speed or a speed derived therefrom and at the supply speed or a speed derived therefrom. A suitable construction of gear is one of such ratios that the driven member of the gear drives the overlap conveyor at a speed equal to, or approximately equal to, one eighth of the sum of the ejection speed and supply speed.

As a result of this scheme the machine operator has only to adjust the speeds of the supply and take-off mechanism which he can oversee at a glance, while the man at the stack can adjust the ejection speed to give perfect piling. Moreover, because of the influence of the ejection speed upon the overlap speed the ratio of the latter to the supply speed (or the take-off speed) is greater at low working speeds than at high working speeds, and the free length of the issuing sheets diminishes as the working speed and the effect of air resistance increase. So a free length of sheet adjusted at a low working speed will the more certainly be within safe limits at a higher working speed. So the invention not only simplifies and facilitates the control of the machine but also makes possible the attainment of higher speeds than hitherto.

The high-speed conveyor bands 7, 8 run at a take-off speed $b$ which is somewhat greater than the supply speed $v$. The ratio of these speeds $$a = \frac{b}{v}$$

is here called the factor of load. On the low-speed conveyor 9 the roll 10 bears with adjustable pressure at a distance from the end frame 11 of the take-off mechanism equal to the length of sheet L. Because of the lesser speed of the conveyor 9 the sheets slide one over the other upon the conveyor like the tiles of a roof. The number of sheets overlapped, or the degree of overlap is $$Z = \frac{v}{u}$$

$u$ being the overlap speed, that is, the speed of the conveyor 9. To ensure that the leading edge of the sheet issuing from the high speed conveyor 7, 8 remains out of contact with the low-speed conveyor 9 until it has passed the rear edge of the preceding sheet upon the conveyor 9, the sheets are bent lengthwise in well known manner to stiffen them. None the less the length $y$ of free exit of the sheet must not be too great. This length, which is also known as the factor of risk, is $$y = L \frac{a-1}{Za-1}$$

or $$y = \frac{C}{b/u - 1}$$

if the distance between two sheets is $$C = \left(\frac{b}{v} - 1\right)L$$

Beyond the overlap conveyor the sheets come to the sheet delivery mechanism consisting of the rolls 12 and 13 with the belts etc. thereto belonging, and by these they are slid upon the pile 14 at an ejection speed $s$. The ejection speed must be kept within definite limits, dependent on the size and kind of paper, say between 20 and 80 metres per minute, and must be maintained for a while after the supply of paper has been stopped in order that the severed sheets upon the conveyors beyond the cutter may be automatically stacked. The ejection speed may be greater or less than the overlap speed. In the former case the overlap is momentarily reduced, in the latter case increased.

Figure 2 shows the scheme of drive of the elements of a transverse cutter machine most usual hitherto. Driving means comprising a motor Mv and a continuously variable gear Gv, or alternatively a variable speed motor, drive the draw-in rolls 4 at the supply speed $v$, and also drive various auxiliary devices which need not be considered here. This same driving means also drives, through continuously variable gears GQ, Gb and Gu respectively, the cutter drum carrying blade 5 at a speed of revolution Q, the take-off rolls 7, 8 at speed $b$ and the overlap belts 9 at speed $u$. The drive of the ejector rolls 12 and 13 is derived, usually through a non-variable gear Gs, from the overlap conveyor. In some schemes used hitherto the speed $u$ is derived not directly from speed $v$ but from speed $b$. As already mentioned it has also been proposed to drive the members having speeds $s$ and $u$ from a special auxiliary motor through an over-running clutch, this motor ensuring a minimum speed of these elements, above which the drive is taken over through another one-way clutch by the main driving means Mr Gv as already described. The disadvantages of this scheme have been explained above.

To obviate these disadvantages the invention employs the scheme of drive shown in Figure 3. Here there is no connection at all between the main driving means Mv, Gv and the sheet delivery mechanism 12, 13. The latter is driven by separate driving means consisting of a motor Ms and variable gear Gs (or a variable speed motor) at a speed which is independently adjustable whatever the supply speed $v$. The driving of the overlap conveyor 9 is effected through a differential gear D the drive of which is dependent on both speeds $v$ and $s$. The driving members of the differential gear are therefore connected with the driving means Mv, Gv and Ms, Gs respectively. While the driven member of the gear drives the overlap band 9 at speed $u$. Preferably the ratios of the differential gear are made such that the speed $$u = \frac{b+s}{8}$$

but other ratios may be chosen where constructional features and conditions made that desirable.

The scheme of Figure 3 enables the attendant looking after the pile of sheets to adjust the ejection speed $s$ at all times, irrespective of the speed of supply $v$, so that tidy piling is ensured. Also the sheet delivery mechanism continues to run at the same speed when the rest of the machine is shut down, until the sheets still on the conveyors have been stacked. At low working speeds the speed of the overlapping conveyor is mainly determined by the ejection speed; at high working speeds it will chiefly depend on the supply speed. So, as above explained, the factor of risk (that is the length of free issue from the take-off conveyor) to which the machine is adjusted at low speeds diminishes as the working speed increases, which is what is wanted for satisfactory working, and necessitates exact adjustment of the overlap mechanism at low working speed.

The invention is not limited to the construction shown and described; modifications are possible which do not affect the fundamental notion.

For example one member of the differential gear may be driven not from parts moving at the supply speed but from parts moving at a speed derived from the supply speed, for example from parts moving at the take-off speed. Also one or both of the driving members of the differential gear may be driven through a variable gear, so permitting alteration of the value $$\frac{b+s}{8}$$

Instead of a differential gear other known means may be employed by which two speeds are combined linearly or otherwise to produce a third speed.

I claim:

1. A machine for operating upon cut sheets of paper fed thereinto from a previous operation at a predetermined linear speed, including a first conveyor and means for driving the conveyor at a linear speed $b$, a second conveyor receiving the sheets from said first conveyor and means for driving said second conveyor at a linear speed $u$, a plurality of sheet delivery rolls and independently controllable means for driving said rolls at a peripheral speed $s$ for stacking said sheets in a pile, whereby the first conveyor receives the cut sheets, the second conveyor receives the sheets from the first conveyor in over-lapped condition, and the delivery rolls receive sheets from the second conveyor and operate to stack them in a pile, said roll-driving means being independent of the means for feeding the sheets at said speed $b$, and additive transmission means coupling the second conveyor driving means of speed $u$ to both the first conveyor driving means of speed $b$ and to the roll-driving means of speed $s$, said transmission means being arranged so that the various speeds are inter-related according to the equation $$u=\frac{b+s}{R}$$

wherein $R$ is a constant having a value between 2 and 10.

2. A machine according to claim 1, in which $R$ has a value of 3.

GERALD STRECKER.

References Cited in the file of this patent
UNITED STATES PATENTS

| Number | Name | Date |
|---|---|---|
| 722,937 | Begg | Mar. 17, 1903 |
| 1,545,915 | Maxson | July 14, 1925 |
| 1,618,584 | Ehlig | Feb. 22, 1927 |
| 2,291,261 | Taylor | July 28, 1942 |
| 2,498,061 | Apgar | Feb. 21, 1950 |